United States Patent
Sawabe et al.

(10) Patent No.: US 12,413,532 B2
(45) Date of Patent: Sep. 9, 2025

(54) PACKET CONTROL SYSTEM, PACKET CONTROL METHOD, AND PACKET CONTROL APPARATUS

(71) Applicant: NEC Corporation, Tokyo (JP)

(72) Inventors: Anan Sawabe, Tokyo (JP); Yusuke Shinohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/024,907

(22) PCT Filed: Jun. 30, 2022

(86) PCT No.: PCT/JP2022/026312
§ 371 (c)(1),
(2) Date: Mar. 6, 2023

(87) PCT Pub. No.: WO2024/004152
PCT Pub. Date: Jan. 4, 2024

(65) Prior Publication Data
US 2024/0283747 A1    Aug. 22, 2024

(51) Int. Cl.
*H04L 47/56* (2022.01)
*H04L 43/087* (2022.01)

(52) U.S. Cl.
CPC ............ *H04L 47/56* (2013.01); *H04L 43/087* (2013.01)

(58) Field of Classification Search
None
See application file for complete search history.

(56) References Cited

U.S. PATENT DOCUMENTS

| | | | | |
|---|---|---|---|---|
| 8,971,345 B1* | 3/2015 | McCanne | ........... | H04L 47/2441 370/412 |
| 9,013,999 B1* | 4/2015 | Kondapalli | ........... | H04L 47/215 370/412 |
| 9,025,467 B2* | 5/2015 | Hu | ........................ | H04L 49/10 370/336 |

(Continued)

FOREIGN PATENT DOCUMENTS

| | | | | |
|---|---|---|---|---|
| EP | 4184887 A1 * | 5/2023 | ............. | H04L 47/00 |
| JP | 2011-024027 A | 2/2011 | | |

(Continued)

OTHER PUBLICATIONS

WO-2020162106-A1 (Original and Machine Translated) (Year: 2020).*

(Continued)

*Primary Examiner* — Sandarva Khanal
(74) *Attorney, Agent, or Firm* — Sughrue Mion, PLLC

(57) ABSTRACT

In order to make it possible to control a delay jitter in packet transmission control, a packet control system (1) includes: an acquisition unit (11) that acquires a packet associated with a delay jitter which is requested; an enqueue unit (12) that enqueues the packet into a queue at a level which corresponds to the delay jitter associated with the packet among a plurality of queues which are classified into levels such that delay jitters are different for the respective levels; and a dequeue unit (13) that dequeues, in accordance with a dequeue timing specified for the queue, the packet which has been enqueued into the queue at the level corresponding to the delay jitter associated with the packet, and that sends the packet which has been dequeued to a network.

14 Claims, 13 Drawing Sheets

(56) References Cited

U.S. PATENT DOCUMENTS

| | | | | |
|---|---|---|---|---|
| 10,277,518 | B1* | 4/2019 | Matthews | H04L 47/50 |
| 11,095,563 | B1* | 8/2021 | Nelson | H04L 41/0816 |
| 11,706,124 | B2* | 7/2023 | Nagarajan | H04L 47/2483 |
| | | | | 709/238 |
| 11,902,151 | B2* | 2/2024 | Nagarajan | H04L 45/302 |
| 2006/0140128 | A1* | 6/2006 | Chi | H04L 43/50 |
| | | | | 370/389 |
| 2007/0177621 | A1* | 8/2007 | Chang | H04L 47/266 |
| | | | | 370/412 |
| 2008/0244075 | A1* | 10/2008 | Kuo | H04L 67/104 |
| | | | | 709/227 |
| 2011/0176554 | A1* | 7/2011 | Yamada | H04L 47/29 |
| | | | | 370/412 |
| 2013/0070584 | A1* | 3/2013 | Hutchison | H04L 43/10 |
| | | | | 370/216 |
| 2016/0044695 | A1* | 2/2016 | Gunner | H04L 49/205 |
| | | | | 370/336 |
| 2021/0176182 | A1* | 6/2021 | Yuan | H04L 43/16 |
| 2022/0103486 | A1* | 3/2022 | Sawabe | H04L 41/082 |
| 2022/0210080 | A1* | 6/2022 | Nagarajan | H04L 61/2517 |

FOREIGN PATENT DOCUMENTS

| | | | | |
|---|---|---|---|---|
| JP | 2013-034164 A | | 2/2013 | |
| WO | WO-2020026983 A1 | * | 2/2020 | H04L 47/215 |
| WO | 2020/162106 A1 | | 8/2020 | |
| WO | WO-2023151772 A1 | * | 8/2023 | H04L 47/50 |

OTHER PUBLICATIONS

International Search Report for PCT Application No. PCT/JP2022/026312, mailed on Oct. 4, 2022.

Written opinion for PCT Application No. PCT/JP2022/026312, mailed on Oct. 4, 2022.

English translation of International Search Report for PCT Application No. PCT/JP2022/026312, mailed on Oct. 4, 2022.

* cited by examiner

PACKET CONTROL SYSTEM, PACKET CONTROL METHOD, AND PACKET CONTROL APPARATUS

This application is a National Stage Entry of PCT/JP2022/026312 filed on Jun. 30, 2022, the contents of all of which are incorporated herein by reference, in their entirety.

TECHNICAL FIELD

The present invention relates to a technique for controlling packets.

BACKGROUND ART

A technique in which transmission control of packets is carried out using a plurality of queues has been proposed. For example, Patent Literature 1 discloses a relay apparatus in which packets are distributed and stored in any of a plurality of queues in accordance with values that have been obtained by a predetermined function from delivery information pertaining to delivery of communication packets, and the packets are outputted while a band for each queue is controlled. Patent Literature 2 indicates that packets are distributed to queues in accordance with types of the packets, a scheduled transmission time is determined in accordance with a quality of service (QOS) value set for each of the queues, and the packets are outputted.

CITATION LIST

Patent Literature

[Patent Literature 1]
  Japanese Patent Application Publication Tokukai No. 2013-34164
[Patent Literature 2]
  Japanese Patent Application Publication Tokukai No. 2011-24027

SUMMARY OF INVENTION

Technical Problem

In some cases, it is demanded to appropriately control a delay jitter as a communication quality requirement. The techniques disclosed in Patent Literatures 1 and 2 have a problem that a delay jitter cannot be controlled.

An example aspect of the present invention is attained in view of the problem, and an example object is to provide a packet control technique that is capable of controlling a delay jitter.

Solution to Problem

A packet control system according to an example aspect of the present invention, at least one processor, the at least one processor carrying out: an acquisition process of acquiring a packet associated with a delay jitter which is requested; an enqueuing process of enqueuing the packet into a queue at a level which corresponds to the delay jitter associated with the packet among a plurality of queues which are classified into levels such that delay jitters are different for the respective levels; and a dequeuing process of dequeuing, in accordance with a dequeue timing specified for the queue, the packet which has been enqueued into the queue at the level corresponding to the delay jitter associated with the packet, and sending the packet which has been dequeued to a network.

A packet control method according to an example aspect of the present invention includes: acquiring, by at least one processor, a packet associated with a delay jitter that is requested; enqueuing, by the at least one processor, the packet into a queue at a level which corresponds to the delay jitter associated with the packet among a plurality of queues which are classified into levels such that delay jitters are different for the respective levels; and dequeuing, by the at least one processor and in accordance with a dequeue timing specified for the queue, the packet which has been enqueued into the queue at the level corresponding to the delay jitter associated with the packet, and sending, by the at least one processor, the packet which has been dequeued to a network.

A packet control apparatus according to an example aspect of the present invention, comprising at least one processor, the at least one processor carrying out: an acquisition process of acquiring a packet associated with a delay jitter which is requested; an enqueuing process of enqueuing the packet into a queue at a level which corresponds to the delay jitter associated with the packet among a plurality of queues which are classified into levels such that delay jitters are different for the respective levels; and a dequeuing process of dequeuing, in accordance with a dequeue timing specified for the queue, the packet which has been enqueued into the queue at the level corresponding to the delay jitter associated with the packet, and sending the packet which has been dequeued to a network.

Advantageous Effects of Invention

According to an example aspect of the present invention, it is possible to control a delay jitter in packet transmission control.

EXAMPLE EMBODIMENT

First Example Embodiment

Figure 1:
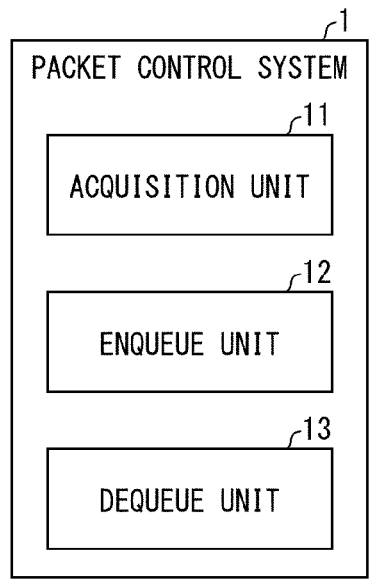
FIG. 1 is a block diagram illustrating a configuration of a packet control system method according to a first example embodiment.

The following description will discuss a first example embodiment of the present invention in detail with reference to the drawings. The present example embodiment is a basic form of an example embodiment described later.
<Configuration of Packet Control System>
The following description will discuss a configuration of a packet control system 1 according to the present example embodiment with reference to FIG. 1. FIG. 1 is a block diagram illustrating a configuration of the packet control system 1. The packet control system 1 includes an acquisition unit 11, an enqueue unit 12, and a dequeue unit 13. The acquisition unit 11, the enqueue unit 12, and the dequeue unit 13 are examples of an acquisition section, an enqueue section, and a dequeue section, respectively, in this specification.

The acquisition unit 11 acquires a packet associated with a delay jitter that is requested. A packet that is acquired by the acquisition unit 11 is to be subjected to transmission control. The acquisition unit 11 may acquire a packet that is not associated with a delay jitter which is requested, in addition to the packet that is associated with the delay jitter which is requested. A packet that is acquired by the acquisition unit 11 may be associated not only with a delay jitter but also with a delay time which is requested, or with a throughput which is requested. Examples of the packet associated with a delay jitter that is requested include a packet which is used in an application in which the order of packets is important. Examples of the packet include, but are not limited to, packets for instructing operation of electronic apparatuses and the like (e.g., robot control), and packets for regular interval communication (e.g., real time IoT sensing). In a case where a delay jitter is constant, for example, it is possible to provide suitable control (e.g., an electronic apparatus such as a robot can be smoothly controlled) by setting control parameters corresponding to the delay jitter.

As a technique for associating a packet with a delay jitter, a delay time, a throughput, and the like which are requested, for example, a tag (information bit, or the like) in which requirements are described can be given as a header or a trailer of the packet. Alternatively, for example, a delay jitter that is requested may be associated with each packet by describing requirements in an option field of a header of the packet. The requirements (delay jitter, delay time, throughput, and the like) associated with a packet vary depending on, for example, the type of application of the packet. In other words, the requirements associated with the packet correspond to the type of application.

The enqueue unit 12 enqueues a packet into a queue at a level which corresponds to a delay jitter associated with the packet among a plurality of queues which are classified into levels such that delay jitters are different for the respective levels. The plurality of queues are used by the packet control system 1 for packet transmission control. For example, different timings are specified for the plurality of queues as dequeue timings. The level corresponding to a delay jitter is, for example, a first level that is specified using the delay jitter. For example, the enqueue unit 12 reenqueues a packet which has been dequeued from a queue at a second level into a queue at the first level that corresponds to the delay jitter associated with the packet, the second level being different from the first level.

The plurality of levels have different corresponding delay jitters. In other words, the level is a classification that is assigned in accordance with a range of delay jitter values. More specifically, for example, delay granularity is greater as the level increases, and delay granularity is smaller as the level decreases. However, the plurality of levels are not limited to the example described above, and may be levels that satisfy other criteria.

The dequeue unit 13 dequeues, in accordance with a dequeue timing specified for a queue, a packet which has been enqueued into the queue at a level corresponding to a delay jitter associated with the packet, and sends the packet which has been dequeued to a network. That is, the dequeue unit 13 controls a delay jitter which is at a timing of dequeuing a packet from each queue such that the delay jitter corresponds to a level of that queue. In this specification, the term "dequeue" refers to an action of taking out a packet from a queue. Moreover, the phrase "sending of a packet" refers to an action of sending a dequeued packet to a communication link.

Figure 2:
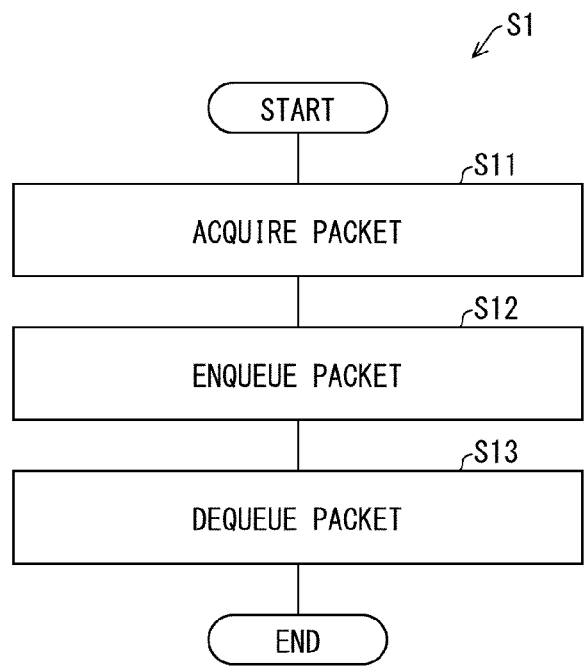
FIG. 2 is a flowchart illustrating a flow of a packet control method according to the first example embodiment.

As described above, the packet control system 1 according to the present example embodiment employs the configuration including: an acquisition unit 11 that acquires a packet associated with a delay jitter which is requested; an enqueue unit 12 that enqueues the packet into a queue at a level which corresponds to the delay jitter associated with the packet among a plurality of queues which are classified into levels such that delay jitters are different for the respective levels; and a dequeue unit 13 that dequeues, in accordance with a dequeue timing specified for the queue, the packet which has been enqueued into the queue at the level corresponding to the delay jitter associated with the packet, and that sends the packet which has been dequeued to a network. Therefore, according to the packet control system 1 according to the present example embodiment, it is possible to bring about an effect that a delay jitter can be controlled in packet transmission control.
<Flow of Packet Control Method>
The following description will discuss a flow of a packet control method S1 according to the present example embodiment with reference to FIG. 2. FIG. 2 is a flowchart illustrating the flow of the packet control method S1. An execution subject of each step in the packet control method S1 may be a processor that is included in the packet control system 1 or may be a processor that is included in another apparatus. Alternatively, the execution subject of each step can be processors that are provided in different apparatuses.

In a step S11, at least one processor acquires a packet associated with a delay jitter that is requested. In a step S12, the at least one processor enqueues the packet into a queue at a level which corresponds to the delay jitter associated with the packet among a plurality of queues which are classified into levels such that delay jitters are different for the respective levels. In a step S13, the at least one processor dequeues, in accordance with a dequeue timing specified for the queue, the packet which has been enqueued into the queue at the level corresponding to the delay jitter associated with the packet, and sends the packet which has been dequeued to a network.

As described above, the packet control method S1 according to the present example embodiment employs the configuration including: acquiring a packet associated with a delay jitter that is requested; enqueuing the packet into a queue at a level which corresponds to the delay jitter associated with the packet among a plurality of queues which are classified into levels such that delay jitters are different for the respective levels; and dequeuing, in accordance with a dequeue timing specified for the queue, the packet which has been enqueued into the queue at the level corresponding to the delay jitter associated with the packet, and sending the packet which has been dequeued to a network. Therefore, according to the packet control method S1 according to the present example embodiment, it is possible to bring about an effect that a delay jitter can be controlled in packet transmission control.

<Configuration of Packet Control Apparatus>

Figure 3:
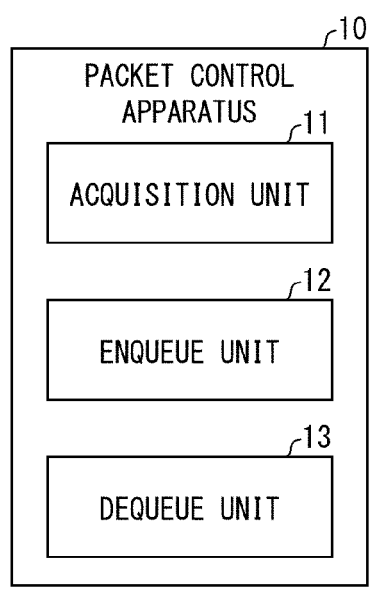
FIG. 3 is a block diagram illustrating a configuration of a packet control apparatus according to the first example embodiment.

The following description will discuss a configuration of a packet control apparatus 10 according to the present example embodiment with reference to FIG. 3. FIG. 3 is a block diagram illustrating a configuration of the packet control apparatus 10. The packet control apparatus 10 includes an acquisition unit 11, an enqueue unit 12, and a dequeue unit 13. The acquisition unit 11, the enqueue unit 12, and the dequeue unit 13 have the same functions as the acquisition unit 11, the enqueue unit 12, and the dequeue unit 13 included in the packet control system 1 described above.

As described above, the packet control apparatus 10 according to the present example embodiment employs the configuration including: an acquisition unit 11 that acquires a packet associated with a delay jitter which is requested; an enqueue unit 12 that enqueues the packet into a queue at a level which corresponds to the delay jitter associated with the packet among a plurality of queues which are classified into levels such that delay jitters are different for the respective levels; and a dequeue unit 13 that dequeues, in accordance with a dequeue timing specified for the queue, the packet which has been enqueued into the queue at the level corresponding to the delay jitter associated with the packet, and that sends the packet which has been dequeued to a network. Therefore, according to the packet control apparatus 10 according to the present example embodiment, it is possible to bring about an effect that a delay jitter can be controlled in packet transmission control.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are not repeated.

<Configuration of Information Processing Apparatus>

Figure 4:
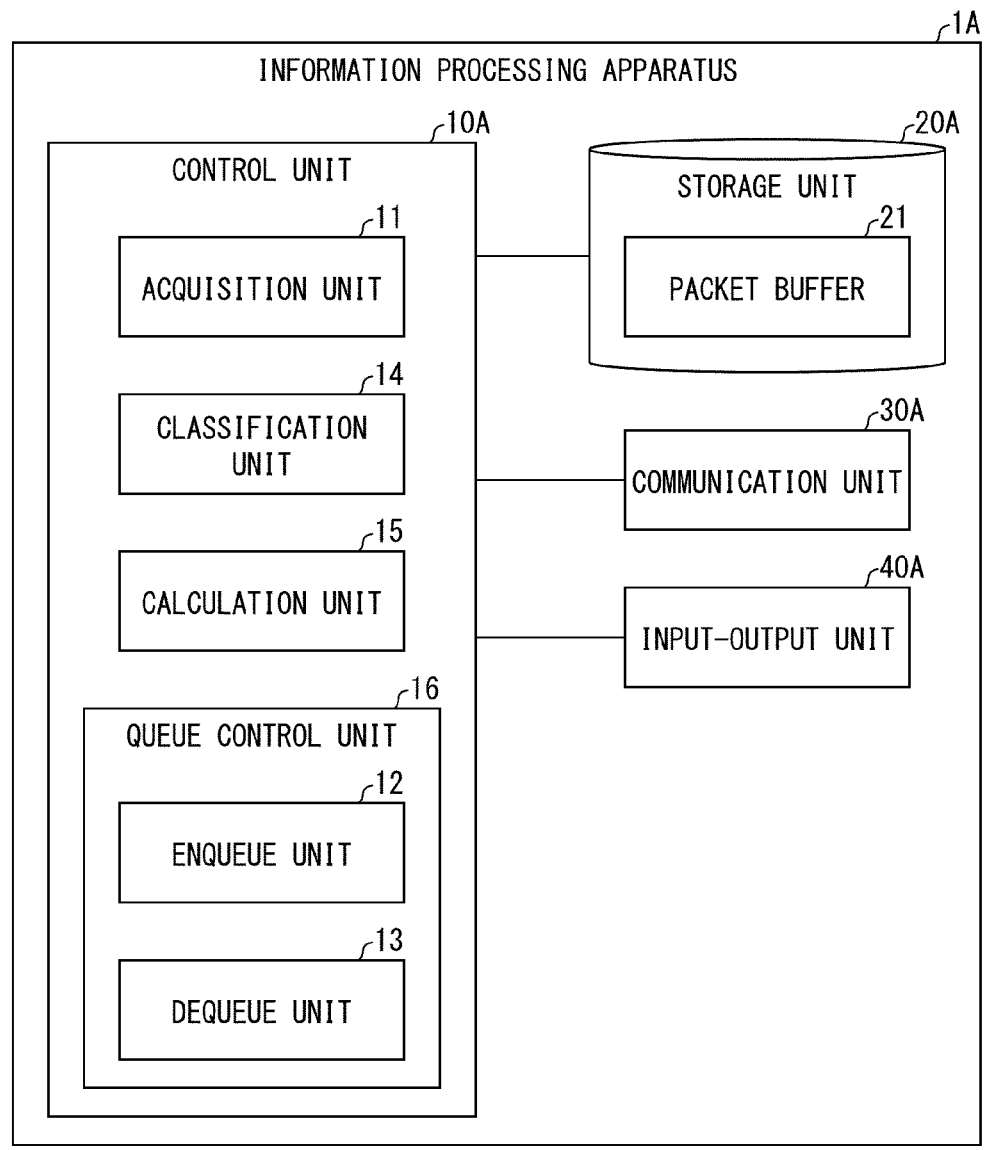
FIG. 4 is a block diagram illustrating a configuration of an information processing apparatus according to a second example embodiment.

FIG. 4 is a block diagram illustrating a configuration of an information processing apparatus 1A. The information processing apparatus 1A is an apparatus that controls transmission of a packet, and is, for example, a relay apparatus. The information processing apparatus 1A is an example of the packet control apparatus according to this specification. The information processing apparatus 1A carries out network slicing by soft slicing in which communication link resource allocation is carried out in accordance with a request of an application. That is, the information processing apparatus 1A carries out packet transmission control by queuing using a plurality of queues. As illustrated in FIG. 4, the information processing apparatus 1A includes a control unit 10A, a storage unit 20A, a communication unit 30A, and an input-output unit 40A.

One or some of the functional units of the information processing apparatus 1A may be mounted on an apparatus different from the information processing apparatus 1A. For example, it is possible that a calculation unit 15 is mounted on another apparatus that is different from the information processing apparatus 1A, the information processing apparatus 1A receives a calculation result of the calculation unit 15 from the another apparatus, and a queue control unit 16 is operated. The another apparatus may be disposed in a cloud.

(Communication Unit 30A)

The communication unit 30A communicates with an apparatus outside of the information processing apparatus 1A via a communication line. A specific configuration of the communication line does not limit the present example embodiment, and the communication line is, for example, a wireless local area network (LAN), a wired LAN, a wide area network (WAN), a public network, a mobile data communication network, Wi-Fi (registered trademark), long term evolution (LTE), 5G, local 5G, 4G, 3G, or a combination of these. The communication unit 30A transmits data supplied from the control unit 10A to another apparatus and supplies data received from another apparatus to the control unit 10A.

(Input-Output Unit 40A)

Input-output apparatuses such as a keyboard, a mouse, a display, a printer, and a touch panel are connected to the input-output unit 40A. The input-output unit 40A receives input of various kinds of information with respect to the information processing apparatus 1A from a connected input apparatus. The input-output unit 40A outputs various kinds of information to a connected output apparatus under control by the control unit 10A. Examples of the input-output unit 40A include interfaces such as universal serial bus (USB).

(Control Unit 10A)

As illustrated in FIG. 4, the control unit 10A includes an acquisition unit 11, a classification unit 14, a calculation unit 15, and a queue control unit 16.

(Acquisition Unit 11)

The acquisition unit 11 acquires a packet that is to be subjected to transmission control. For example, at least one of an arrival time of a packet, a delay time that is requested, a throughput that is requested, and a delay jitter that is requested is associated with the packet which is to be subjected to transmission control. From the delay time that is requested and the arrival time of the packet, a sending timing that is requested is specified. Therefore, it can be said that the packet which is associated with the arrival time of the packet and the delay time that is requested is a packet which is associated with the sending timing that is requested. In other words, the acquisition unit 11 acquires the packet that is associated with the sending timing that is requested and with the delay jitter. The acquisition unit 11 acquires a packet that is associated with the delay jitter and a packet that is not associated with the delay jitter. In other words, the acquisition unit 11 acquires a packet that is associated with a throughput which is requested.

(Classification Unit 14)

The classification unit 14 carries out classification of packets. For example, the classification unit 14 carries out classification on the basis of the type of application of a packet or the like, and outputs a flow ID indicating a result of the classification. The term "classification" refers to, for example, an action of classifying packets in accordance with which one of a throughput, a delay, and a delay jitter is requested. For example, a packet for which a throughput is requested is a packet of a moving image, and a packet for which a delay is requested is a packet of urgent communication. A packet for which a delay jitter is requested is, for example, a packet of real time sensing or of remote control.

(Calculation Unit 15)

The calculation unit 15 calculates a packet-out requirement, which is a requirement for packet-out. The packet-out requirement is various conditions demanded in packet-out of a packet. The packet-out requirement includes, for example, a request time and a request level. The request time is a time of packet-out which is requested. The request time is an example of a sending timing according to this specification. The request level is a level of a queue for which packet-out is requested. The request level is an example of the first level according to this specification. A method for calculating a packet-out requirement that is carried out by the calculation unit 15 will be described later.

(Queue Control Unit 16)

The queue control unit 16 carries out packet transmission control by queuing using a plurality of queues. The queue control unit 16 carries out packet transmission control using, for example, a calendar queuing technique. The queue control unit 16 includes an enqueue unit 12 and a dequeue unit 13. The enqueue unit 12 enqueues a packet into one of a plurality of queues which are classified into levels. The enqueue unit 12 reenqueues a packet which has been dequeued from a queue at a second level into a queue at a first level that corresponds to the delay jitter associated with the packet, the second level being different from the first level.

The dequeue unit 13 dequeues a packet from each queue in accordance with a dequeue timing specified for each of a plurality of queues. The dequeue unit 13 sends the packet which has been dequeued from the request level to a network.

(Storage Unit 20A)

The storage unit 20A includes a packet buffer 21. The packet buffer 21 is a memory space that is secured for storing packets waiting for transmission. Packets which have been buffered in the packet buffer 21 are sent to a network after delay times and the like thereof are controlled by the plurality of queues.

Figure 5:
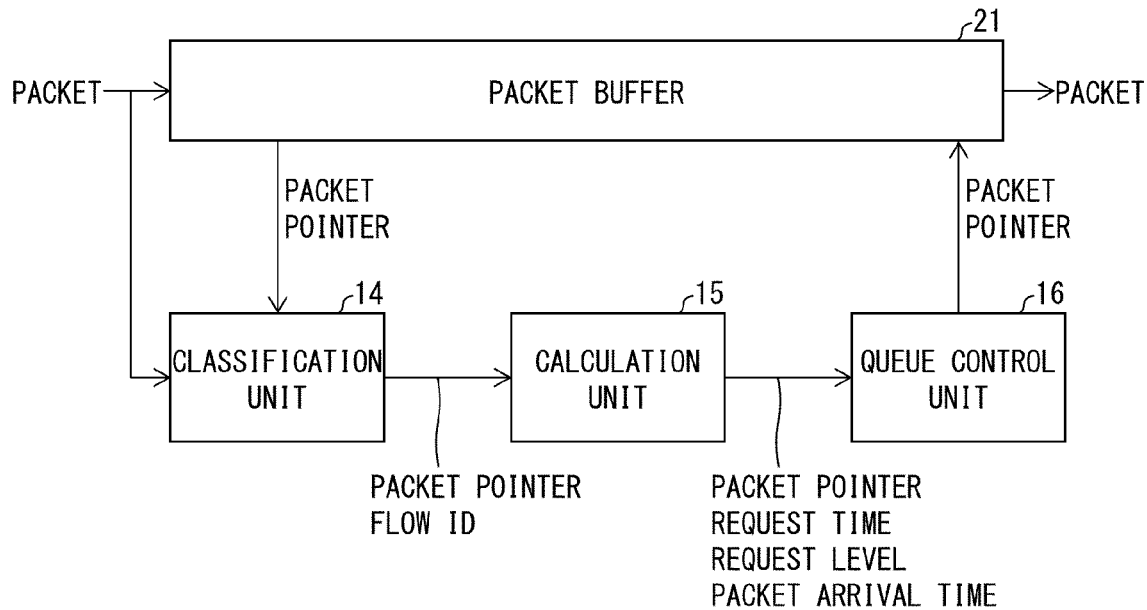
FIG. 5 is a diagram schematically illustrating an example configuration related to packet transmission control by the information processing apparatus according to the second example embodiment.

FIG. 5 is a diagram schematically illustrating an example configuration related to packet transmission control by the information processing apparatus 1A. Note that, in FIG. 5, the unidirectional arrow simply indicates the direction of flow of a certain signal (data), and is not intended to eliminate bidirectionality. In the example illustrated in FIG. 5, the classification unit 14 carries out packet classification and supplies a flow ID indicating the classification result to the calculation unit 15 together with a packet pointer that has been acquired from the packet buffer 21. The classification by the classification unit 14 is carried out on the basis of, for example, the type of application. The flow ID indicating the classification result is referred to when the calculation unit 15 calculates a packet-out requirement. The calculation unit 15 calculates a packet-out requirement by a calculation method corresponding to the flow ID. In other words, the calculation unit 15 specifies a packet-out requirement in accordance with the type of application. The calculation unit 15 can also be said to change a numerical value or a weight that is used to calculate a packet-out requirement, in accordance with the type of application. Note that the flow ID indicating the classification result is not referred to in queue control by the queue control unit 16. The packet pointer is a pointer which indicates a storage location of each packet in the packet buffer 21.

The calculation unit 15 calculates a packet-out requirement by a calculation method corresponding to the flow ID. In the present example embodiment, the calculation unit 15 calculates a request time and a request level as packet-out requirements. The calculation unit 15 supplies the calculated packet-out requirements to the queue control unit 16 together with a packet pointer and a packet arrival time. The queue control unit 16 carries out packet transmission control using a plurality of queues. The queue control unit 16 carries out transmission control by queuing with use of the plurality of queues and sends packets to a network.

Figure 6:
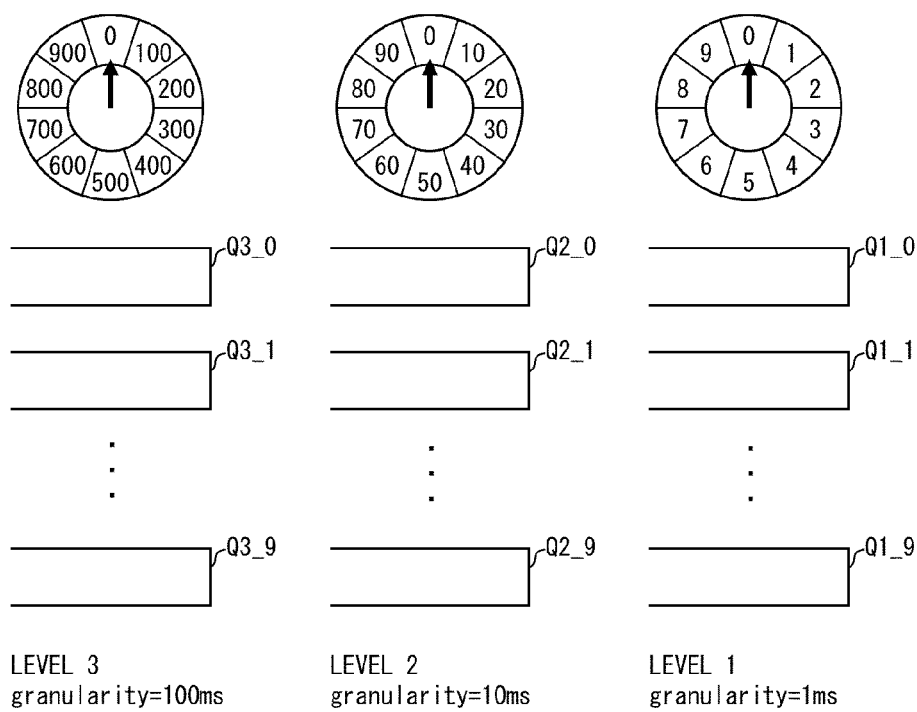
FIG. 6 is a diagram illustrating a specific example of a plurality of queues according to the second example embodiment.

The following description will discuss a specific example of a plurality of queues that are used by the queue control unit 16 for packet transmission control, with reference to the drawings. FIG. 6 is a diagram illustrating a specific example of a plurality of queues. In the example illustrated in FIG. 6, the queue control unit 16 carries out packet transmission control by calendar queuing with use of (i×j) queues $Qi\_j$ ($1 \leq i \leq 3$, $0 \leq j \leq 9$). The plurality of queues $Qi\_j$ are classified into a plurality of levels i. That is, ten queues $Qi\_0$ through $Qi\_9$ are prepared for each level i. In the example illustrated in FIG. 6, a level 3 is the highest level and a level 1 is the lowest level. Further, in the example illustrated in FIG. 6, a virtual time unit is set to 1 [ms].

The plurality of queues vary in delay granularity for each level. In other words, the plurality of queues are classified into levels such that delay granularity is greater as the level increases. In the example of FIG. 6, the delay granularity of the queues $Q1\_j$ at the level 1 is 1 [ms]. The delay granularity of the queues $Q2\_j$ at the level 2 is 10 [ms]. The delay granularity of the queues $Q3\_j$ at the level 3 is 100 [ms].

The enqueue unit 12 enqueues a packet which is to be subjected to transmission control into a queue corresponding to a request time associated with the packet. The dequeue unit 13 dequeues, in accordance with a dequeue timing specified for the queue, the packet which has been enqueued into the queue. Details of the enqueuing process and the dequeuing process will be described later.

<Flow of Packet Control Method>

The information processing apparatus 1A carries out packet transmission control with use of a plurality of queues. In the following description, (i) a packet enqueuing process and (ii) a packet dequeuing process will be described in order.

((i) Packet Enqueuing Process)

Figure 7:
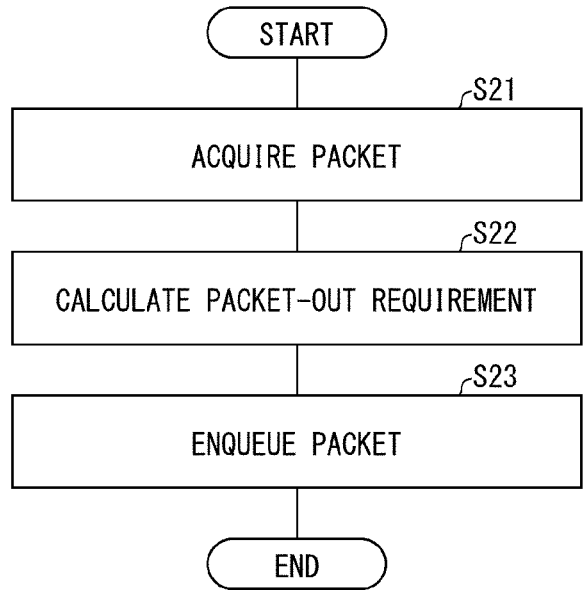
FIG. 7 is a flowchart illustrating a flow of an enqueuing process according to the second example embodiment.

FIG. 7 is a flowchart illustrating a flow of a packet enqueuing process.

(Steps S21 and S22)

In a step S21, the acquisition unit 11 acquires a packet which is to be subjected to transmission control. Moreover, in a step S22, the calculation unit 15 calculates a packet-out requirement for the packet acquired in the step S21. The calculation unit 15 calculates a packet-out requirement by a calculation method that corresponds to the type of request flow. The following description will discuss specific examples of methods for calculating a packet-out requirement for cases of a throughput request flow (a), a delay request flow (b), and a delay jitter request flow (c).
(Throughput Request Flow (a))

The throughput request flow (a) is a flow in which a throughput is requested. In a case where a transmission time of one previous packet is defined as "$u_{t-1}$ [s]", a packet size is defined as "s [byte]", and a request throughput is "x [bps]", a request time u at which packet-out is requested is, for example, $u=u_{t-1}+8s/x$.

In the case of the throughput request flow, a delay jitter is not requested and it is not necessary to control the delay jitter. Therefore, the request level 1 is an arbitrary level. Therefore, for example, the calculation unit 15 sets the request level 1 to be the highest level of a plurality of queues. In other words, the calculation unit 15 calculates the highest level among a plurality of levels as the request level 1 for a packet that is not associated with a delay jitter. For example, in a case where levels 1 to 3 are set as levels for queues, the calculation unit 15 determines the level 3 as the request level 1.

Note that the method for calculating the request time u and the request level 1 is not limited to the example described above, and the calculation unit 15 may calculate the request time u or the request level 1 by another method. For example, the calculation unit 15 may calculate, as the request level 1 for a packet associated with a throughput, a level that is one level below a level corresponding to calculation granularity of the throughput.
(Delay Request Flow (b))

The delay request flow is a flow in which a delay is requested. In a case where the current time is defined as "t [s]" and a delay time that is requested is defined as "y [s]", the request time u is, for example, represented as follows: $u=t+y$.

In the case of the delay request flow, a delay jitter is not requested and it is not necessary to control the delay jitter. Therefore, the request level 1 is an arbitrary level. Therefore, for example, the calculation unit 15 sets the request level 1 to be the highest level of a plurality of queues. In other words, the calculation unit 15 calculates the highest level among a plurality of levels as the request level 1 for a packet that is not associated with a delay jitter. For example, in a case where levels 1 to 3 are set as levels for queues, the calculation unit 15 determines the level 3 as the request level 1.

Note that the method for calculating the request time u and the request level 1 is not limited to the example described above, and the calculation unit 15 may calculate the request time u or the request level 1 by another method. For example, the calculation unit 15 may calculate, as the request level 1 for a packet associated with a throughput, a level that is one level below a level corresponding to calculation granularity of the throughput.
(Delay Jitter Request Flow (c))

The delay jitter request flow is a flow in which a delay jitter is requested. In this case, a transmission time of one previous packet is defined as "$u_{t-1}$ [s]", a delay time that is requested is defined as "y [s]", and a delay jitter that is requested is defined as "z [s]". Furthermore, granularity of the level i of a queue is defined as "$g_i$" and a virtual time unit is defined as "v". Then, the request time u is, for example, represented as follows: $u=u_{t-1}+y$. The request level 1 is, for example, represented as follows: $1=\mathrm{argmax}_i (g_i v < z)$. In other words, the calculation unit 15 calculates a request level (first level) with use of a delay jitter associated with a packet.
(Step S23)

In a step S23 of FIG. 7, the enqueue unit 12 enqueues the packet acquired in the step S21 into one of the plurality of queues. More specifically, the enqueue unit 12 enqueues the packet into a queue corresponding to the request time u which has been calculated by the calculation unit 15. In other words, the enqueue unit 12 enqueues the packet acquired by the acquisition unit 11 into a queue corresponding to the request time u which is associated with the packet.

In the example illustrated in FIG. 6, the enqueue unit 12 refers to the last three digits of the request time u, and enqueues packets whose last three digits are between 000 and 00j [ms] ($0 \leq j \leq 9$) into queues Q1_j at the level 1. Moreover, the enqueue unit 12 enqueues packets whose last three digits are between 010 and 099 [ms] into queues Q2_j at the level 2. More specifically, the enqueue unit 12 enqueues packets for which values of the second digit from the last of the request time u are j ($0 \leq j \leq 9$) into the queues Q2_j at the level 2. The enqueue unit 12 enqueues packets whose last three digits are between 100 and 999 [ms] into queues Q3_j at the level 3. More specifically, the enqueue unit 12 enqueues packets for which values of the third digit from the last of the request time u are j ($0 \leq j \leq 9$) into the queues Q3_j at the level 3.

More specifically, for example, the enqueue unit 12 enqueues a packet for which the request time u is 50 [ms] to 59 [ms] into a queue Q2_5 at the level 2. Moreover, for example, the enqueue unit 12 enqueues a packet for which the request time u is 60 [ms] to 69 [ms] into a queue Q2_6 at the level 2. Furthermore, for example, the enqueue unit 12 enqueues a packet for which the request time is 100 [ms] to 199 [ms] into a queue Q3_1 at the level 3.
(Specific Example of Enqueuing)

Figure 8:
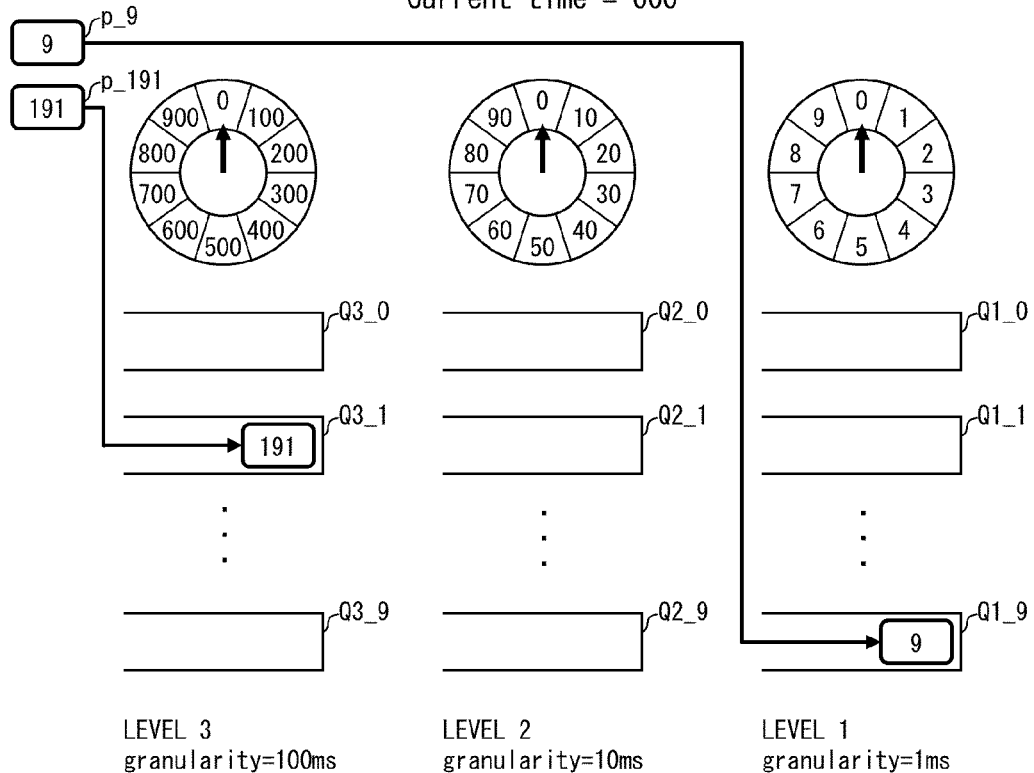
FIG. 8 is a diagram illustrating a specific example of the enqueuing process according to the second example embodiment.

FIG. 8 is a diagram illustrating a specific example of the enqueuing process. In the example illustrated in FIG. 8, the enqueue unit 12 enqueues a packet p_9, for which the request time u calculated by the calculation unit 15 is "9", into a queue Q1_9 at the level 1. Moreover, the enqueue unit 12 enqueues a packet p_191, for which the request time u calculated by the calculation unit 15 is "191", into a queue Q3_1 at the level 3.
((ii) Packet Dequeuing Process)

Figure 9:
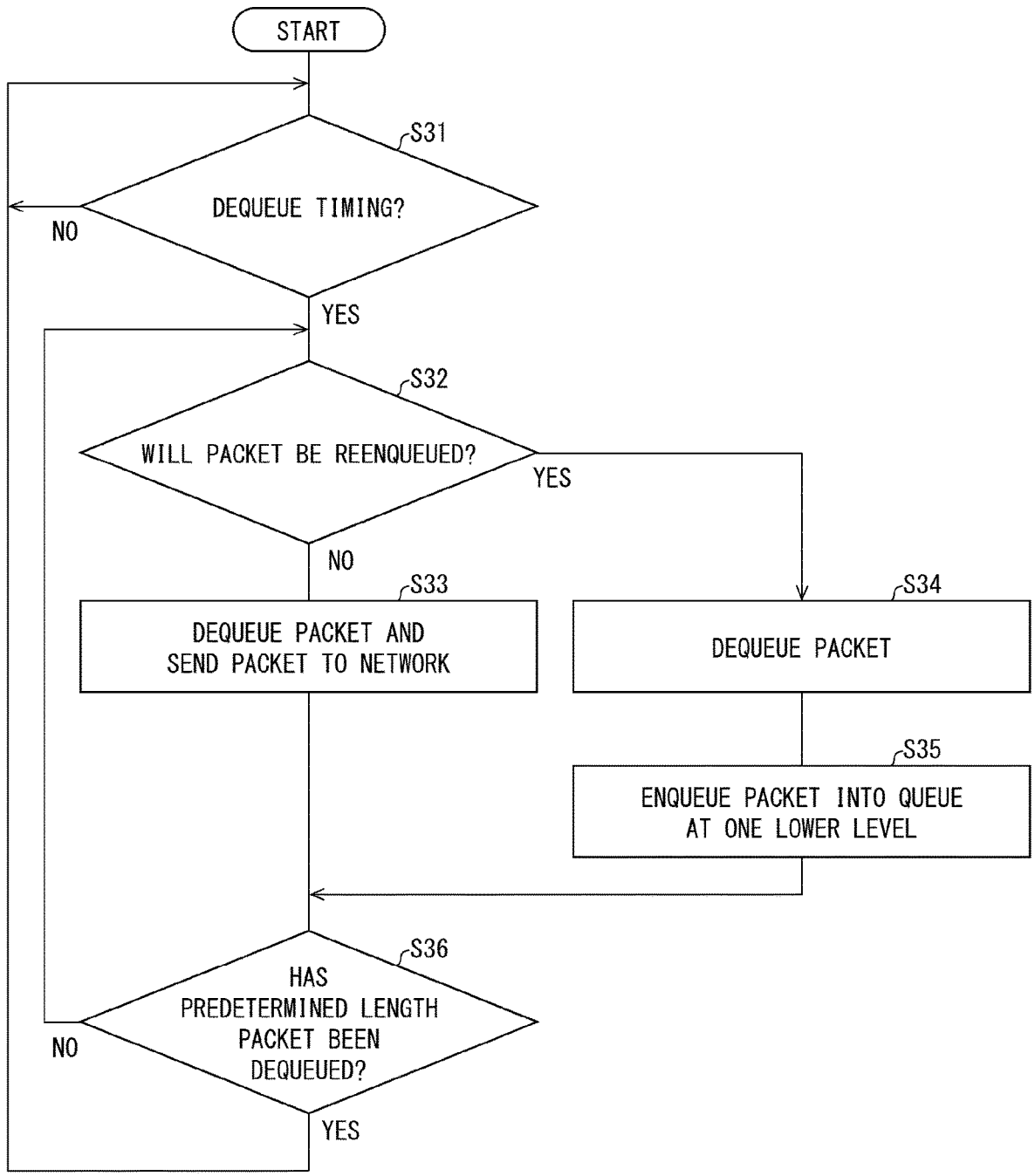
FIG. 9 is a flowchart illustrating a flow of a dequeuing process according to the second example embodiment.

FIG. 9 is an example flowchart illustrating a flow of a dequeuing process that is carried out by the information processing apparatus 1A. In this example, the dequeue unit 13 carries out the process illustrated in FIG. 9 for each of the (i×j) queues Qi_j. Note, however, that the flow of the dequeuing process that is carried out by the dequeue unit 13 is not limited to the example illustrated in FIG. 9.
(Step S31)

In a step S31, the dequeue unit 13 determines whether or not it is a dequeue timing specified for a queue Qi_j that is to be processed. In a case where it is the dequeue timing (YES in the step S31), the dequeue unit 13 proceeds to a process of a step S32. Meanwhile, in a case where it is not the dequeue timing (NO in the step S31), the dequeue unit 13 waits until the dequeue timing comes.

Here, the dequeue timing specified for each of n queues Qi_j at the level i is, for example, times $(j \cdot n^{i-1})$, $(j \cdot n^{i-1}+1)$, $(j \cdot n^{i-1}+2)$, ..., and $(j+1) \cdot n^{i-1}-1)$. In this case, the dequeue timing specified for the queue Q3_1 is 100, 101, 102, ..., and 199 [ms]. Moreover, for example, the dequeue timing specified for the queue Q1_9 is 9 [ms].

(Step S32)

In a step S32, the dequeue unit 13 determines whether or not to carry out reenqueuing. Specifically, for example, the dequeue unit 13 determines whether or not the request level 1 of a packet (a packet at the beginning of a queue) which is to be dequeued is higher than the level i of a queue Qi_j which is to be processed, and thus determines whether or not to carry out reenqueuing. In a case where the request level 1 is equal to or higher than the level i of the queue Qi_j to be processed, the dequeue unit 13 determines not to carry out reenqueuing. Meanwhile, in a case where the request level 1 is lower than the level i, the dequeue unit determines to carry out reenqueuing. In the case where reenqueuing is not carried out (NO in the step S32), the dequeue unit 13 proceeds to a process of a step S33. Meanwhile, in the case where reenqueuing is carried out (YES in the step S32), the dequeue unit 13 proceeds to a process of a step S34.

Note, however, that the method for carrying out the determination process in the step S32 is not limited to the example described above, and the dequeue unit 13 may determine whether or not to carry out reenqueuing by another method. For example, the dequeue unit 13 may determine whether or not to carry out reenqueuing according to whether or not a value of a delay jitter that is requested satisfies a predetermined condition. More specifically, for example, it is possible that the dequeue unit 13 carries out reenqueuing in a case where the value of the delay jitter that is requested is equal to or less than a threshold value, and determines to carry out packet-out without carrying out reenqueuing in a case where the value of the delay jitter that is requested is equal to or greater than the threshold value.
(Step S33)

In a step S33, the dequeue unit 13 dequeues a packet and sends the packet to a network.
(Steps S34 and S35)

In a step S34, the dequeue unit 13 dequeues a packet from the queue Qi_j. In a step S35, the enqueue unit 12 enqueues the packet which has been dequeued by the dequeue unit 13 in the step S34 into a queue at a level that is one level below, that is, a queue Q(i−1)_j at the level (i−1). In other words, the enqueue unit 12 enqueues a packet which has been dequeued from a queue at the second level into a queue at a level that is one level below the second level, the second level being higher than the request level (first level).

By repeating the processes of the steps S32 through S36 in FIG. 9, the process is repeated in which a packet which has been enqueued into a queue is reenqueued into a queue at a level that is one level below that of said queue, and the packet which has been reenqueued is further reenqueued into a queue at a level that is another one level below.
(Step S36)

In a step S36, the dequeue unit 13 determines whether or not a packet included in a predetermined length of the queue Qi_j that is subjected to determination has been dequeued. The predetermined length is, for example, a queue length $(1/n^{i-1})$. Here, "i" is the level and "n" is the number of queues at each level. In a case where a packet included in a predetermined length has been dequeued (YES in the step S36), the dequeue unit 13 returns to the process in the step S31 and waits until the next dequeue timing comes. Meanwhile, in a case where a packet included in a predetermined length has not been dequeued (NO in the step S36), the dequeue unit 13 returns to the process of the step S32 and carries out a dequeuing process for the next packet.

That is, in this example, the dequeue unit 13 dequeues, at a dequeue timing specified for a queue Qi_j, a part of packets (i.e., a packet(s) included in a queue length of $(1/n^{i-1})$ instead of dequeuing all the packets which have been enqueued into the queue Qi_j. By repeating the process of dequeuing a part of packets every time a dequeue timing comes, all packets which have been enqueued into n queues Qi_j at the level i are dequeued when a time $n^{i-1}$ has elapsed.

For example, packets are discharged from the queue Q2_5 in units of 1/10 during a period between 50 [ms] and 59 [ms]. That is, a packet of 50 [ms] to 59 [ms] is discharged at an arbitrary timing during a period between 50 [ms] and 59 [ms].

Packets are discharged from the queue Q2_6 in units of 1/10 during a period between 60 [ms] and 69 [ms]. That is, a packet of 60 [ms] to 69 [ms] is discharged at an arbitrary timing during a period between 60 [ms] and 69 [ms].

Packets are discharged from the queue Q3_1 in units of 1/100 during a period between 100 [ms] and 199 [ms]. That is, a packet for which the request time is 100 [ms] to 199 [ms] is discharged at an arbitrary timing during a period between 100 [ms] and 199 [ms].

Similarly, packets are discharged from the queue Q3_2 in units of 1/100 during a period between 200 [ms] and 299 [ms]. That is, a packet for which the request time is 200 [ms] to 299 [ms] is discharged at an arbitrary timing during a period between 200 [ms] and 299 [ms].

As described above, by repeatedly carrying out the processes of the steps S31 through S36, the dequeue unit 13 dequeues, in one or more separate stages, packets which have been enqueued into each queue (steps S33 and S34).

As described above, in the example illustrated in FIG. 9, the dequeue unit 13 determines, at a dequeue timing specified for each queue, whether or not to reenqueue a packet to be dequeued (step S32 in FIG. 9). In a case where reenqueuing is carried out, the dequeue unit 13 reenqueues the packet into a queue at a level different from that of the queue (steps S34 and S35). Meanwhile, in a case where reenqueuing is not carried out, the dequeue unit 13 sends the packet which has been dequeued to a network (step S33).
(Specific Examples of Packet-Out Process and Reenqueuing Process)

Figure 10:
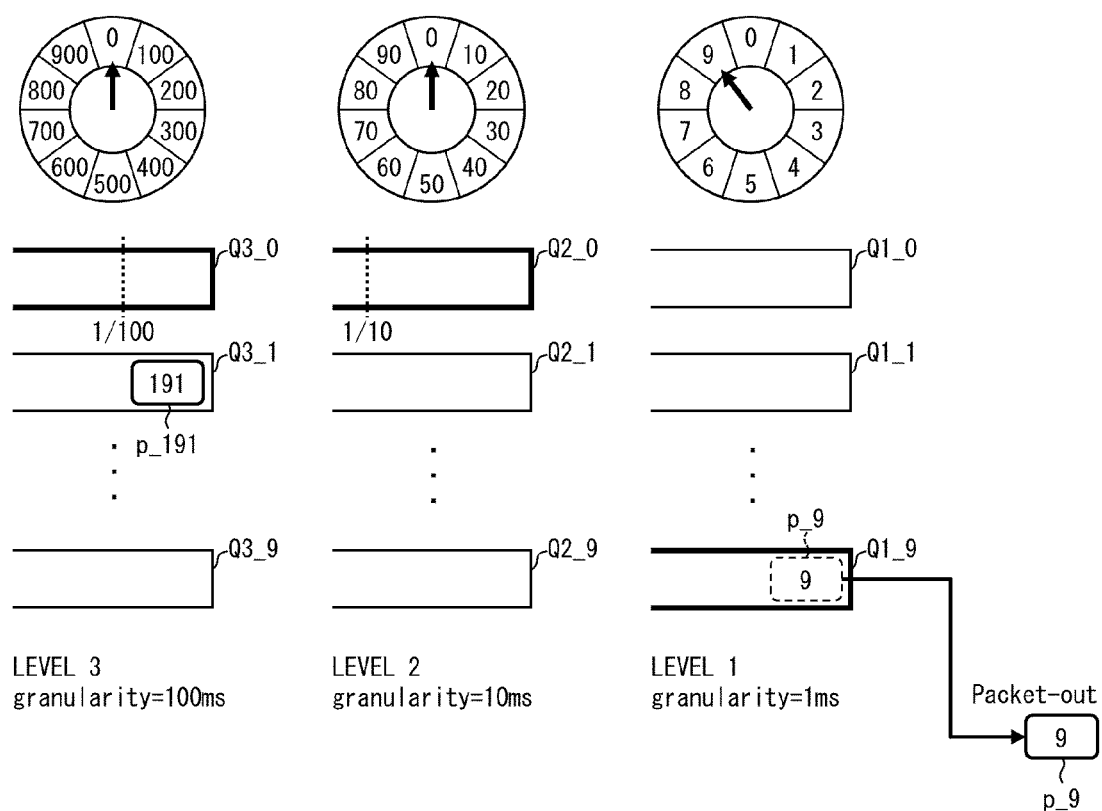
FIG. 10 is a diagram illustrating a specific example of a packet-out process according to the second example embodiment.

Specific examples of the packet-out process and the reenqueuing process will be described with reference to FIGS. 10 through 14. FIG. 10 is a diagram illustrating a specific example of the packet-out process. In the example illustrated in FIG. 10, at a time t=009, the dequeue unit 13 takes out the packet p_9 (packet-out) stored in the queue Q1_9 and thus sends the packet p_9 to a network (step S33 in FIG. 9).

Figure 11:
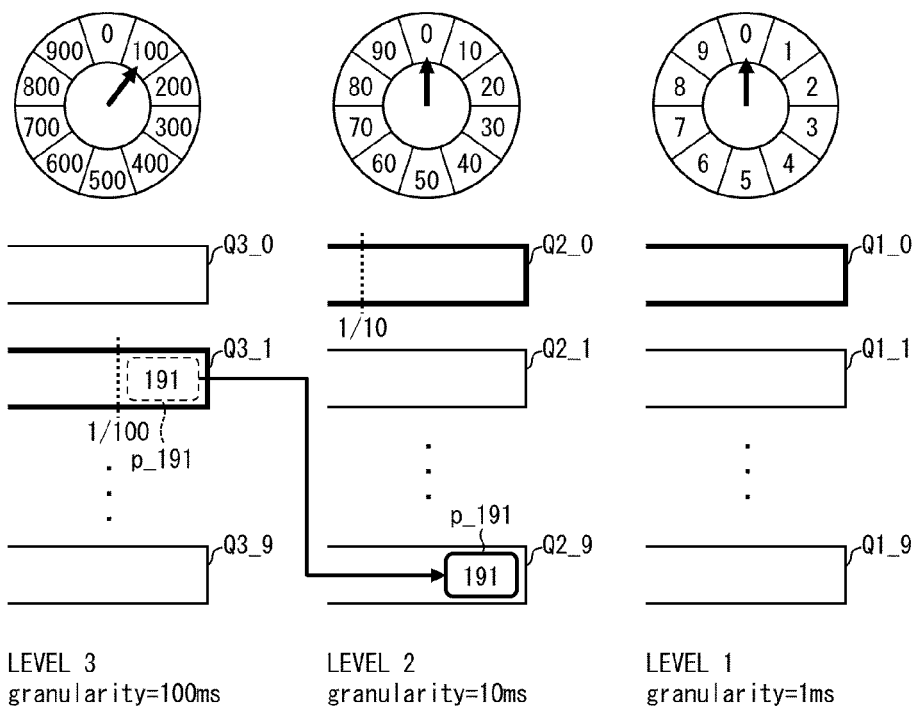
FIG. 11 is a diagram illustrating a specific example of a reenqueuing process according to the second example embodiment.
Figure 12:
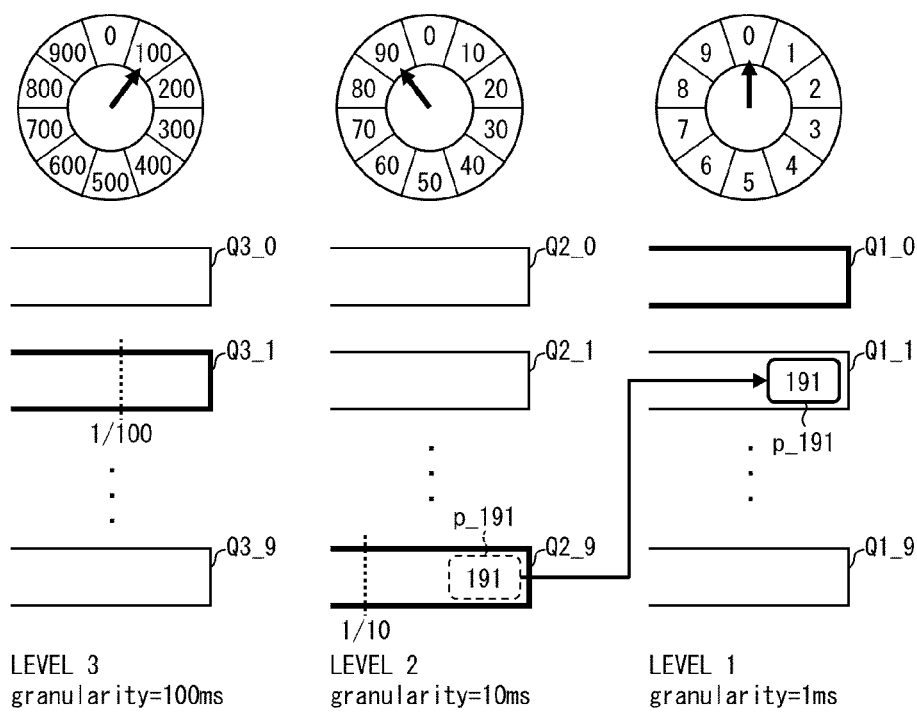
FIG. 12 is a diagram illustrating a specific example of a reenqueuing process according to the second example embodiment.

FIGS. 11 and 12 are diagrams illustrating specific examples of the reenqueuing process. In the example illustrated in FIG. 11, at a time t=100, three queues, i.e., the queue Q3_1, the queue Q2_0, and the queue Q1_0 are to be subjected to dequeuing. Here, in a case where the request level 1 of the packet p_191 stored in the queue Q3_1 is "1", the level "3" of the queue Q3_1 is higher than the request level 1 ("1"). Therefore, the dequeue unit 13 reenqueues the packet p_191 which has been dequeued from the queue Q3_1 into the queue Q2_9 at the level 2 instead of merely taking out the packet p_191 (packet-out) (step S35 in FIG. 9).

In the example illustrated in FIG. 12, at a time t=190, three queues, i.e., the queue Q3_1, the queue Q2_9, and the queue Q1_0 are to be subjected to dequeuing. In a case where the request level 1 of the packet p_191 stored in the queue Q2_9 is "1", the level "2" of the queue Q2_9 is higher than the request level 1 ("1"). Therefore, the dequeue unit 13 reenqueues the packet p_191 which has been dequeued from the queue Q2_9 into the queue Q1_1 at the level 1 instead of merely taking out the packet p_191 (packet-out) (step S35 in FIG. 9).

Figure 13:
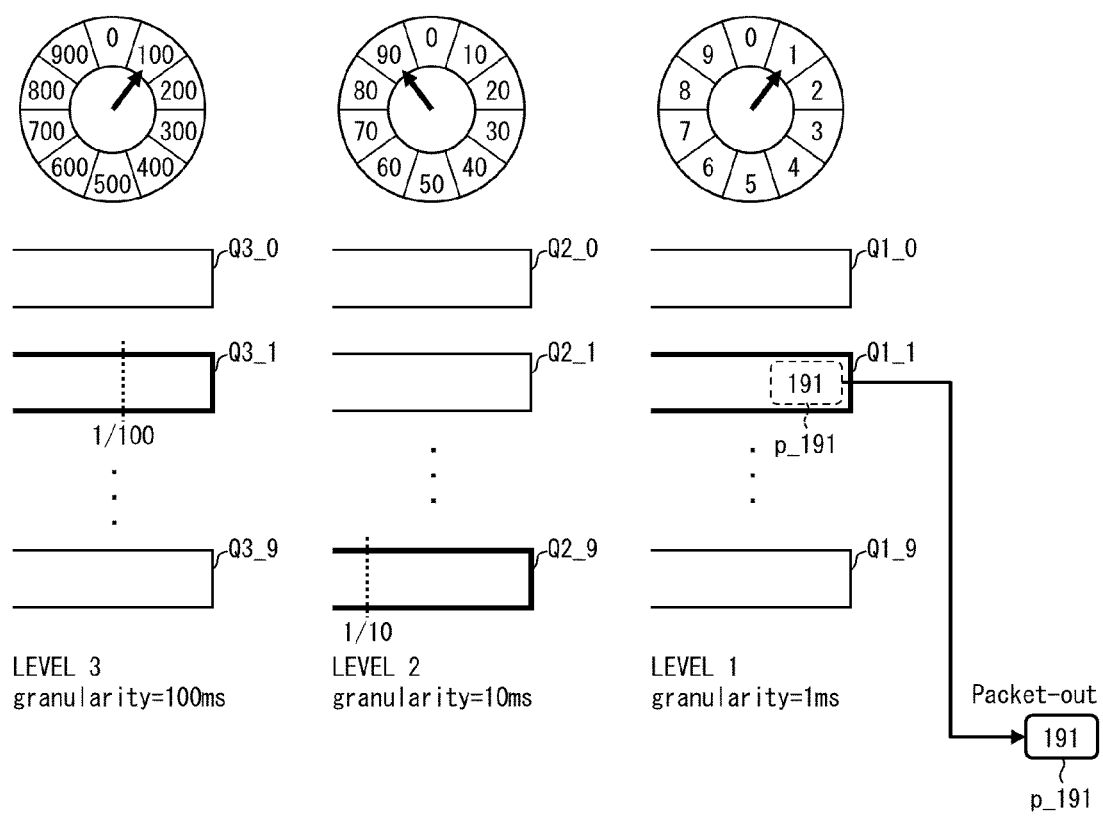
FIG. 13 is a diagram illustrating a specific example of a packet-out process according to the second example embodiment.
Figure 14:
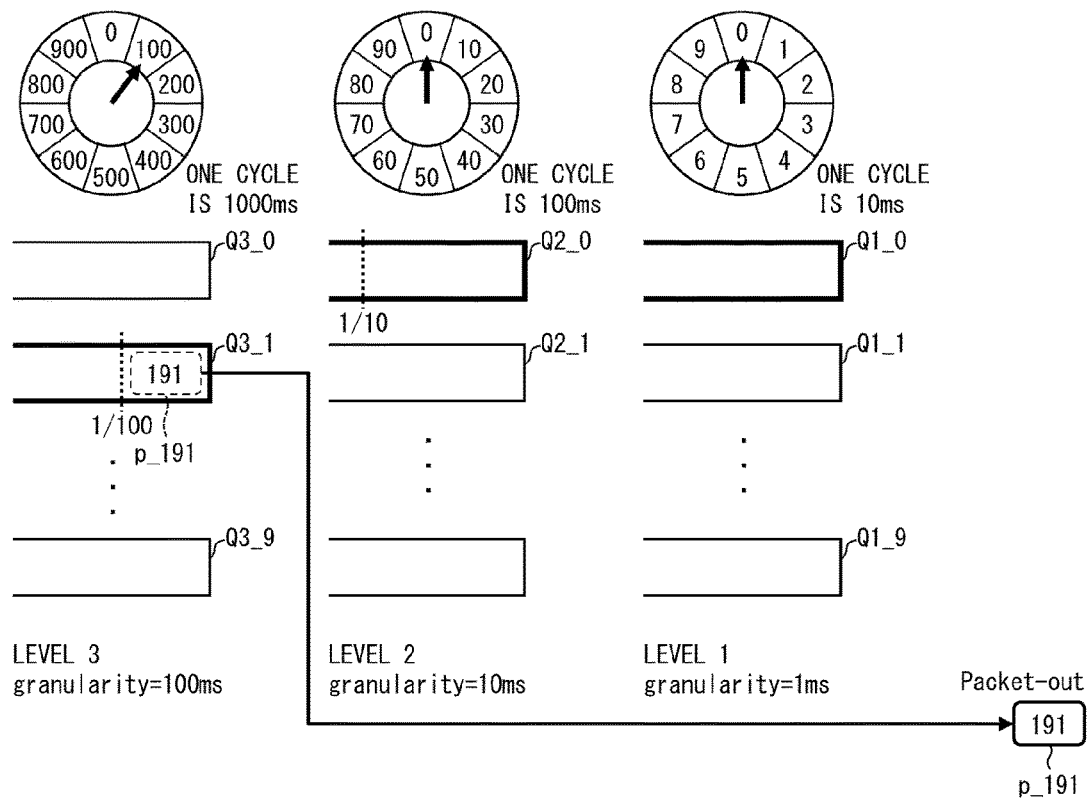
FIG. 14 is a diagram illustrating a specific example of a packet-out process according to the second example embodiment.

FIGS. 13 and 14 are diagrams illustrating specific examples of the packet-out process. At a time t=191, three queues, i.e., the queue Q3_1, the queue Q2_9, and the queue Q1_1 are to be determined as to whether or not dequeuing is carried out. In a case where the request level 1 of the packet p_191 stored in the queue Q1_1 is "1", the dequeue unit 13 dequeues the packet p_191 from the queue Q1_1 and carries out packet-out (step S33 in FIG. 9).

FIG. 14 is a diagram illustrating another specific example of packet-out. At a time t=100, three queues, i.e., the queue Q3_1, the queue Q2_0, and the queue Q1_0 are to be determined as to whether or not dequeuing is carried out. In a case where the request level 1 of the packet p_191 stored in the queue Q3_1 is "3" ("YES" in step S32 of FIG. 9), the dequeue unit 13 dequeues the packet p_191 from the queue Q1_1 and carries out packet-out (step S33 in FIG. 9).

Figure 15:
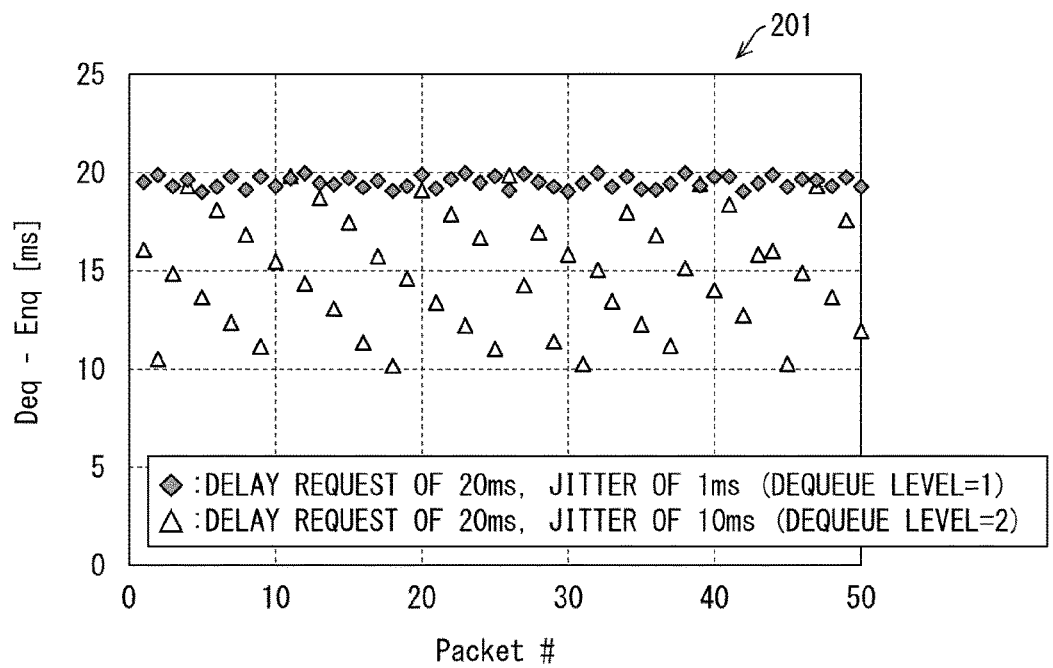
FIG. 15 is a diagram illustrating example results of measuring a delay time and a delay jitter according to the second example embodiment.

FIG. 15 is a diagram illustrating an example of results of measuring a delay time and a delay jitter. In FIG. 15, a graph 201 is a graph showing a result of packet transmission control carried out by the information processing apparatus 1A according to the present example embodiment. As illustrated in FIG. 15, according to the packet transmission control according to the present example embodiment, a delay time of a packet for which a delay time that is requested is 20 [ms] falls within 20 [ms] or less. Moreover, a packet for which a delay jitter that is requested is 1 [ms] has a delay jitter of 1 [ms], and a packet for which a delay jitter that is requested is 10 [ms] has a delay jitter of 10 [ms]. As illustrated in FIG. 15, according to the present example embodiment, both a delay time that is requested and a delay jitter that is requested can be satisfied.

Figure 16:
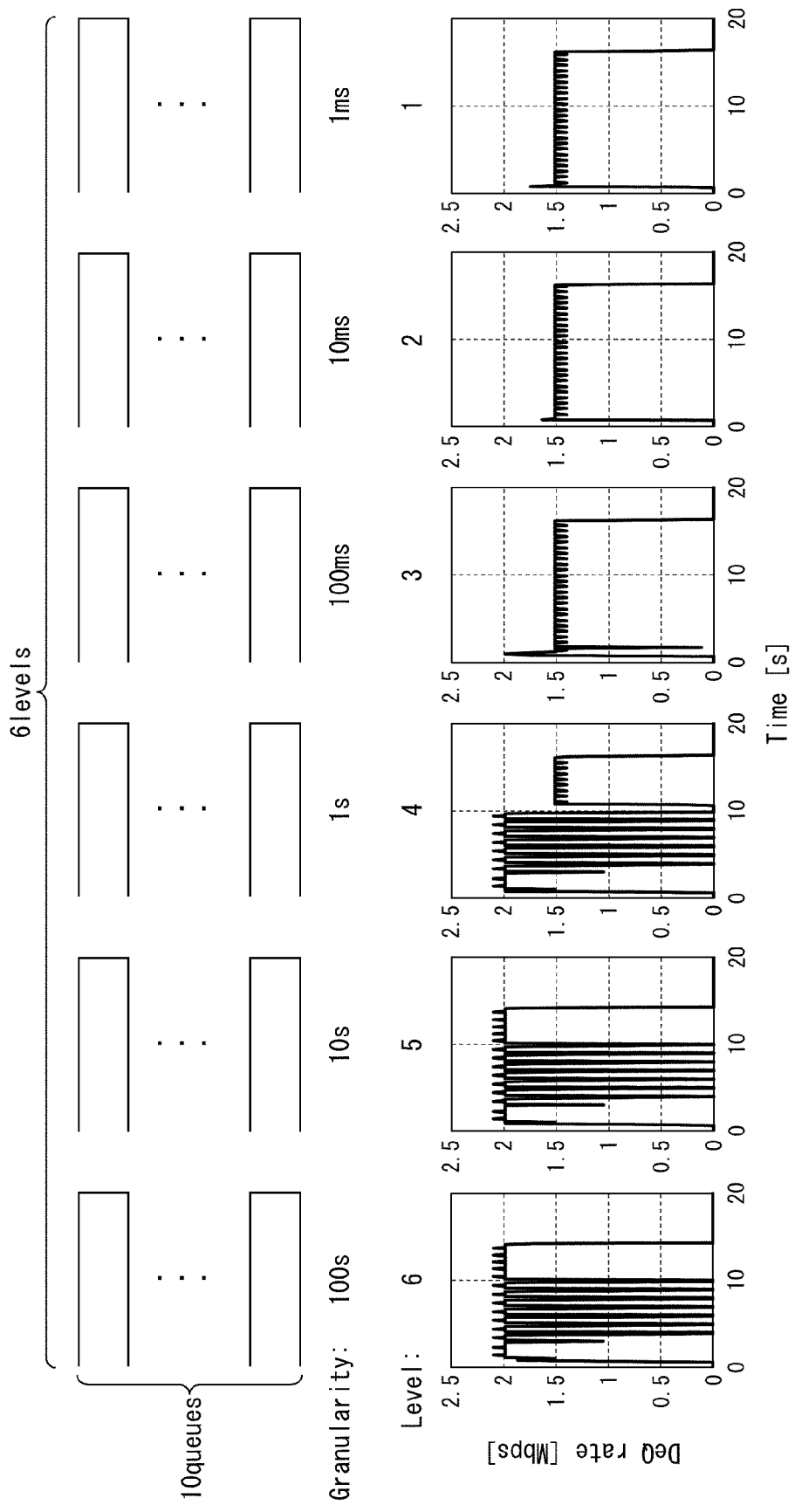
FIG. 16 is a diagram for explaining an example of a process for calculating a request level.

Next, an example of a process for calculating a request level for a packet that is not associated with a delay jitter will be described with reference to the drawings. FIG. 16 is a diagram for explaining an example of a request level calculation process, and shows an example of a dequeue rate [Mbps] when a request level for a packet that is not associated with a delay jitter is changed. In the example illustrated in FIG. 16, a plurality of queues are prepared at each of six levels 1 through 6 that differ in delay granularity, and a result of packet transmission control using these queues is indicated. In the example illustrated in FIG. 16, the levels 1 through 6 have delay granularity of 100 [s], 10 [s], 1 [s], 100 [ms], 10 [ms], and 1 [ms], respectively. Moreover, measurement results with a throughput bin of 100 [ms] are also indicated. As illustrated in FIG. 16, the dequeue rate is stable when the request level is 2 or less. Thus, in order to stabilize the dequeue rate, it is only necessary to set, as the request level, a level with granularity which is one stage finer than a bin size (window width) used in throughput calculation. In other words, it is only necessary to set a level that is one level below demanded throughput calculation granularity, as in examples in which granularity is 10 [ms] (i.e., level 2) when the throughput bin is 100 [ms], and granularity is 100 [ms] (level 3) when the throughput bin is 1 [s].

<Effect of Information Processing Apparatus>

As above described, in the information processing apparatus 1A according to the present example embodiment, the configuration is employed in which the enqueue unit 12 reenqueues a packet which has been dequeued from a queue at a second level into a queue at the request level that corresponds to a delay jitter associated with the packet, the second level being different from the request level. Therefore, according to the information processing apparatus 1A according to the present example embodiment, it is possible to bring about an effect that a delay jitter can be more appropriately controlled, as compared with a case where reenqueuing into a queue at a different level is not carried out.

In the information processing apparatus 1A according to the present example embodiment, the configuration is employed in which the dequeue unit 13 dequeues, in one or more separate stages, packets which have been enqueued into each queue.

As a method for controlling a delay of each packet, it is conceivable that a packet which has been enqueued into each queue is reenqueued into a queue at a lower level. In such a case, however, packets may be concentrated in the queue at the lower level, and the chance of packet dropping may increase. In contrast, in the information processing apparatus 1A according to the present example embodiment, packets which have been enqueued into each queue are dequeued in a plurality of separate stages instead of being reenqueued into a queue at a lower level. This prevents packets from being concentrated in the queue at the lower level, and from being dropped.

The information processing apparatus 1A according to the present example embodiment employs the configuration of further including a calculation unit 15 that calculates the request level with use of a delay jitter associated with a packet. Therefore, according to the information processing apparatus 1A according to the present example embodiment, it is possible to bring about an effect that a delay jitter can be more accurately controlled, as compared with a case where a packet-out level is not calculated with use of a delay jitter.

In the information processing apparatus 1A according to the present example embodiment, the configuration is employed in which: the plurality of queues are classified into levels such that delay granularity is greater as the level increases; the acquisition unit 11 acquires a packet that is associated with a sending timing which is requested and with a delay jitter; the enqueue unit 12 enqueues the packet acquired by the acquisition unit 11 into a queue corresponding to the sending timing associated with the packet and enqueues a packet which has been dequeued from a queue at a second level into a queue at a level that is one level below the second level, the second level being higher than the first level. Therefore, according to the information processing apparatus 1A according to the present example embodiment, it is possible to bring about an effect that a delay jitter can be more accurately controlled by carrying out packet sending control with sequential use of queues at a plurality of levels.

In the information processing apparatus 1A according to the present example embodiment, the configuration is employed in which: the plurality of queues are classified into levels such that delay granularity is greater as the level increases; the acquisition unit 11 acquires a packet that is associated with the delay jitter and a packet that is not associated with the delay jitter; and the calculation unit 15 identifies a highest level among a plurality of levels as the request level for the packet that is not associated with the delay jitter.

In a case where the request level for a packet that is not associated with a delay jitter is set to be a low level, packets may be concentrated in the queue at the lower level, and the chance of packet dropping may increase. In contrast, the information processing apparatus 1A according to the present example embodiment is capable of bringing about an effect of preventing packets from being concentrated in the queue at the lower level, and from being dropped.

In the information processing apparatus 1A according to the present example embodiment, the configuration is employed in which: the acquisition unit 11 acquires a packet that is associated with a throughput which is requested; the plurality of queues are classified into levels such that delay granularity is greater as the level increases; and the calculation unit 15 calculates, as the first level for the packet associated with the throughput, a level that is one level below a level corresponding to calculation granularity of the throughput.

By setting, as the request level, a level that is one level below a level corresponding to calculation granularity of a throughput which is requested, granularity of the throughput can be set as requested when it is necessary to set the granularity of the throughput. Note that, in a case where the bin size is decreased, there exists a section in which a throughput is greater than the requested throughput. However, when viewed in terms of the bin size at the time of setting, the throughput appears to be as requested. Moreover, unnecessary reenqueuing can be avoided by setting the request level as described above. Therefore, it is possible to bring about an effect of reducing packets retained in hierarchical calendar queues and reducing a load of a queue at a low level.

[Software Implementation Example]

The functions of part of or all of the packet control apparatus 10, the information processing apparatus 1A, and the packet control system 1 (hereinafter, referred to as "packet control apparatus 10 and the like") can be realized by hardware such as an integrated circuit (IC chip) or can be alternatively realized by software.

Figure 17:
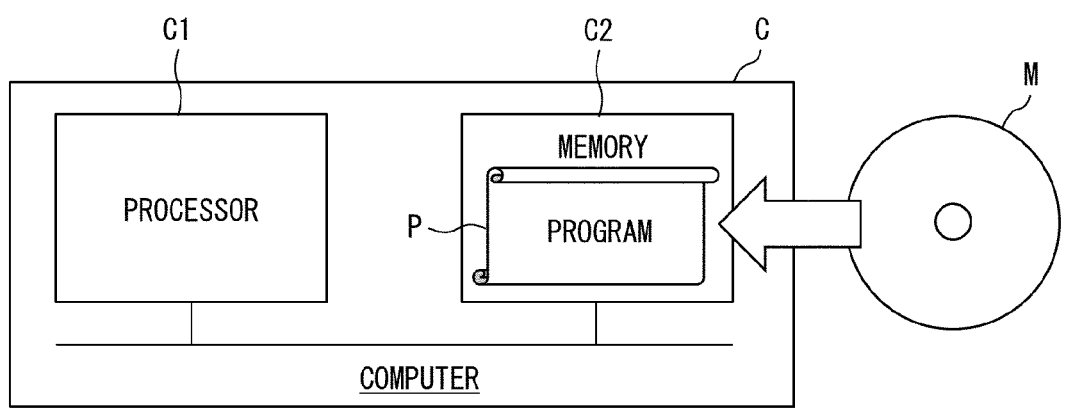
FIG. 17 is a diagram illustrating an example of a computer which executes instructions of a program that is software realizing functions of apparatuses according to example embodiments of the present invention.

In the latter case, each of the packet control apparatus 10 and the like is realized by, for example, a computer that executes instructions of a program that is software realizing the foregoing functions. FIG. 17 illustrates an example of such a computer (hereinafter, referred to as "computer C"). The computer C includes at least one processor C1 and at least one memory C2. The memory C2 stores a program P for causing the computer C to function as the packet control apparatus 10 and the like. In the computer C, the processor C1 reads the program P from the memory C2 and executes the program P, so that the functions of the packet control apparatus 10 and the like are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following example aspects.

Supplementary Note 1

A packet control system including: an acquisition section that acquires a packet associated with a delay jitter which is requested; an enqueue section that enqueues the packet into a queue at a level which corresponds to the delay jitter associated with the packet among a plurality of queues which are classified into levels such that delay jitters are different for the respective levels; and a dequeue section that dequeues, in accordance with a dequeue timing specified for the queue, the packet which has been enqueued into the queue at the level corresponding to the delay jitter associated with the packet, and that sends the packet which has been dequeued to a network.

Supplementary Note 2

The packet control system described in supplementary note 1, in which the enqueue section reenqueues a packet which has been dequeued from a queue at a second level into a queue at a first level that corresponds to the delay jitter associated with the packet, the second level being different from the first level.

Supplementary Note 3

The packet control system described in supplementary note 1 or 2, in which the dequeue section dequeues, in one or more separate stages, packets which have been enqueued into each queue.

Supplementary Note 4

The packet control system described in supplementary note 2 or 3, further including: a calculation section that calculates the first level with use of the delay jitter associated with the packet.

Supplementary Note 5

The packet control system described in any one of supplementary notes 2 through 4, in which: the plurality of queues are classified into levels such that delay granularity is greater as the level increases; the acquisition section acquires the packet that is associated with a sending timing which is requested and with the delay jitter; the enqueue section enqueues the packet acquired by the acquisition section into a queue corresponding to the sending timing associated with the packet and enqueues a packet which has been dequeued from a queue at the second level into a queue at a level that is one level below the second level, the second level being higher than the first level.

Supplementary Note 6

The packet control system described in supplementary note 4, in which: the plurality of queues are classified into levels such that delay granularity is greater as the level increases; the acquisition section acquires the packet that is associated with the delay jitter and a packet that is not associated with the delay jitter; and the calculation section calculates a highest level among a plurality of levels as the first level for the packet that is not associated with the delay jitter.

Supplementary Note 7

The packet control system described in supplementary note 4, in which: the acquisition section acquires a packet that is associated with a throughput which is requested; the plurality of queues are classified into levels such that delay granularity is greater as the level increases; and the calculation section calculates, as the first level for the packet associated with the throughput, a level that is one level below a level corresponding to calculation granularity of the throughput.

Supplementary Note 8

A packet control method including: acquiring a packet associated with a delay jitter that is requested; enqueuing the packet into a queue at a level which corresponds to the delay jitter associated with the packet among a plurality of queues which are classified into levels such that delay jitters are different for the respective levels; and dequeuing, in accordance with a dequeue timing specified for the queue, the packet which has been enqueued into the queue at the level corresponding to the delay jitter associated with the packet, and sending the packet which has been dequeued to a network.

Supplementary Note 9

The packet control method described in supplementary note 8, in which: in the enqueuing, a packet which has been dequeued from a queue at a second level is reenqueued into a queue at a first level that corresponds to the delay jitter associated with the packet, the second level being different from the first level.

Supplementary Note 10

A packet control method described in supplementary note 8 or 9, in which: in the dequeuing, packets which have been enqueued into each queue are dequeued in one or more separate stages.

Supplementary Note 11

The packet control method described in supplementary note 9 or 10, further including: calculating the first level with use of the delay jitter associated with the packet.

Supplementary Note 12

The packet control method described in any one of supplementary notes 9 through 11, in which: the plurality of queues are classified into levels such that delay granularity is greater as the level increases; in the acquiring, the packet that is associated with a sending timing which is requested and with the delay jitter are acquired; in the enqueuing, the packet acquired in the acquiring is enqueued into a queue corresponding to the sending timing associated with the packet; and a packet which has been dequeued from a queue at the second level is enqueued into a queue at a level that is one level below the second level, the second level being higher than the first level.

Supplementary Note 13

The packet control method described in supplementary note 11, in which: the plurality of queues are classified into levels such that delay granularity is greater as the level increases; in the acquiring, the packet that is associated with the delay jitter and a packet that is not associated with the delay jitter are acquired; and in the calculating, a highest level among a plurality of levels is calculated as the first level for the packet that is not associated with the delay jitter.

Supplementary Note 14

The packet control method described in supplementary note 11, in which: in the acquiring, a packet that is associated with a throughput which is requested is acquired; the plurality of queues are classified into levels such that delay granularity is greater as the level increases; and in the calculating, a level that is one level below a level corresponding to calculation granularity of the throughput is calculated as the first level for the packet associated with the throughput.

Supplementary Note 15

A packet control apparatus, including: an acquisition section that acquires a packet associated with a delay jitter which is requested; an enqueue section that enqueues the packet into a queue at a level which corresponds to the delay jitter associated with the packet among a plurality of queues which are classified into levels such that delay jitters are different for the respective levels; and a dequeue section that dequeues, in accordance with a dequeue timing specified for the queue, the packet which has been enqueued into the queue at the level corresponding to the delay jitter associated with the packet, and that sends the packet which has been dequeued to a network.

Supplementary Note 16

The packet control apparatus described in supplementary note 15, in which the enqueue section reenqueues a packet which has been dequeued from a queue at a second level into a queue at a first level that corresponds to the delay jitter associated with the packet, the second level being different from the first level.

Supplementary Note 17

The packet control apparatus described in supplementary note 15 or 16, in which the dequeue section dequeues, in one or more separate stages, packets which have been enqueued into each queue.

Supplementary Note 18

The packet control apparatus described in supplementary note 16 or 17, further including: a calculation section that calculates the first level with use of the delay jitter associated with the packet.

Supplementary Note 19

The packet control apparatus described in any one of supplementary notes 16 through 18, in which: the plurality of queues are classified into levels such that delay granularity is greater as the level increases; the acquisition section acquires the packet that is associated with a sending timing which is requested and with the delay jitter; the enqueue section enqueues the packet acquired by the acquisition section into a queue corresponding to the sending timing associated with the packet and enqueues a packet which has been dequeued from a queue at the second level into a queue at a level that is one level below the second level, the second level being higher than the first level.

Supplementary Note 20

The packet control apparatus described in supplementary note 18, in which: the plurality of queues are classified into levels such that delay granularity is greater as the level increases; the acquisition section acquires the packet that is associated with the delay jitter and a packet that is not associated with the delay jitter; and the calculation section calculates a highest level among a plurality of levels as the first level for the packet that is not associated with the delay jitter.

Additional Remark 3

Furthermore, some of or all of the foregoing example embodiments can also be expressed as below.

A packet control system including at least one processor, the at least one processor executing: an acquisition process of acquiring a packet associated with a delay jitter that is requested; an enqueuing process of enqueuing the packet into a queue at a level which corresponds to the delay jitter associated with the packet among a plurality of queues which are classified into levels such that delay jitters are different for the respective levels; and a dequeuing process of dequeuing, in accordance with a dequeue timing specified for the queue, the packet which has been enqueued into the queue at the level corresponding to the delay jitter associated with the packet, and sending the packet which has been dequeued to a network.

Note that the packet control system can further include a memory. The memory can store a program for causing the at least one processor to execute the acquisition process, the enqueuing process, and the dequeuing process. The program can be stored in a computer-readable non-transitory tangible storage medium.

Furthermore, some of or all of the foregoing example embodiments can also be expressed as below.

A packet control apparatus including at least one processor, the at least one processor executing: an acquisition process of acquiring a packet associated with a delay jitter that is requested; an enqueuing process of enqueuing the packet into a queue at a level which corresponds to the delay jitter associated with the packet among a plurality of queues which are classified into levels such that delay jitters are different for the respective levels; and a dequeuing process of dequeuing, in accordance with a dequeue timing specified for the queue, the packet which has been enqueued into the queue at the level corresponding to the delay jitter associated with the packet, and sending the packet which has been dequeued to a network.

Note that the packet control apparatus can further include a memory. The memory can store a program for causing the at least one processor to execute the acquisition process, the enqueuing process, and the dequeuing process. The program can be stored in a computer-readable non-transitory tangible storage medium.

Although the present invention has been described with reference to the foregoing example embodiments and the like, the present invention is not limited to the foregoing example embodiments. Various modifications which can be understood by a person skilled in the art within the scope of the present invention can be made to the configurations and details of the present invention. At least one or more functions of the packet control apparatus 10 and the like described above may be executed in a plurality of different information processing apparatuses that are installed at and connected to any locations on a network, that is, may be executed in so-called cloud computing.

REFERENCE SIGNS LIST

1: Packet control system
1A: Information processing apparatus
10: Packet control apparatus
10A: Control unit
11: Acquisition unit
12: Enqueue unit
15: Calculation unit
13: Dequeue unit
16: Queue control unit

What is claimed is:

1. A packet control system comprising at least one processor, the at least one processor carrying out:
   an acquisition process of acquiring a packet associated with a delay jitter which is requested;
   an enqueuing process of enqueuing the packet into a queue, among a plurality of queues, at a level which corresponds to the delay jitter associated with the packet, wherein the plurality of queues are classified into levels respectively corresponding to different delay jitters; and
   a dequeuing process of dequeuing, in accordance with a dequeue timing specified for the queue, the packet which has been enqueued into the queue at the level corresponding to the delay jitter associated with the packet, and sending the packet which has been dequeued to a network,
   wherein:
   in the enqueuing process, the at least one processor reenqueues a packet which has been dequeued from a queue at a second level into a queue at a first level that corresponds to the delay jitter associated with the packet, the second level being different from the first level;
   the plurality of queues are classified into levels such that delay granularity is greater as the level increases;

in the acquisition process, the at least one processor acquires the packet that is associated with a sending timing which is requested and with the delay jitter;

in the enqueuing process, the at least one processor enqueues the packet acquired in the acquisition process into a queue corresponding to the sending timing associated with the packet, and the at least one processor enqueues a packet which has been dequeued from a queue at the second level into a queue at a level that is one level below the second level, the second level being higher than the first level.

2. The packet control system as set forth in claim 1, wherein:

in the dequeuing process, the at least one processor dequeues, in one or more separate stages, packets which have been enqueued into each queue.

3. Packet control system as set forth in claim 1, wherein:

the at least one processor further carries out a calculation process of calculating the first level with use of the delay jitter associated with the packet.

4. The packet control system as set forth in claim 3, wherein:

in the acquisition process, the at least one processor acquires the packet that is associated with the delay jitter and a packet that is not associated with the delay jitter; and in the calculation process, the at least one processor calculates a highest level among a plurality of levels as the first level for the packet that is not associated with the delay jitter.

5. The packet control system as set forth in claim 3, wherein:

in the acquisition process, the at least one processor acquires a packet that is associated with a throughput which is requested; and in the calculation process, the at least one processor calculates, as the first level for the packet associated with the throughput, a level that is one level below a level corresponding to calculation granularity of the throughput.

6. A packet control method, comprising:

acquiring, by at least one processor, a packet associated with a delay jitter that is requested;

enqueuing, by the at least one processor, the packet into a queue, among a plurality of queues, at a level which corresponds to the delay jitter associated with the packet, wherein the plurality of queues are classified into levels respectively corresponding to different delay jitters; and dequeuing, by the at least one processor and in accordance with a dequeue timing specified for the queue, the packet which has been enqueued into the queue at the level corresponding to the delay jitter associated with the packet, and sending, by the at least one processor, the packet which has been dequeued to a network, wherein:

in the enqueuing, a packet which has been dequeued from a queue at a second level is reenqueued by the at least one processor into a queue at a first level that corresponds to the delay jitter associated with the packet, the second level being different from the first level;

the plurality of queues are classified into levels such that delay granularity is greater as the level increases;

in the acquiring, the packet that is associated with a sending timing which is requested and with the delay jitter are acquired by the at least one processor;

in the enqueuing, the packet acquired in the acquiring is enqueued by the at least one processor into a queue corresponding to the sending timing associated with the packet; and a packet which has been dequeued from a queue at the second level is enqueued into a queue at a level that is one level below the second level, the second level being higher than the first level.

7. The packet control method as set forth in claim 6, wherein:

in the dequeuing, packets which have been enqueued into each queue are dequeued by the at least one processor in one or more separate stages.

8. The packet control method as set forth in claim 6, further comprising:

calculating, by the at least one processor, the first level with use of the delay jitter associated with the packet.

9. The packet control method as set forth in claim 8, wherein:

in the acquiring, the packet that is associated with the delay jitter and a packet that is not associated with the delay jitter are acquired by the at least one processor; and in the calculating, a highest level among a plurality of levels is calculated by the at least one processor as the first level for the packet that is not associated with the delay jitter.

10. The packet control method as set forth in claim 8, wherein:

in the acquiring, a packet that is associated with a throughput which is requested is acquired by the at least one processor; and in the calculating, a level that is one level below a level corresponding to calculation granularity of the throughput is calculated by the at least one processor as the first level for the packet associated with the throughput.

11. A packet control apparatus, comprising at least one processor, the at least one processor carrying out:

an acquisition process of acquiring a packet associated with a delay jitter which is requested;

an enqueuing process of enqueuing the packet into a queue at a level, among a plurality of queues, which corresponds to the delay jitter associated with the packet, wherein the plurality of queues are classified into levels respectively corresponding to different delay jitters; and a dequeuing process of dequeuing, in accordance with a dequeue timing specified for the queue, the packet which has been enqueued into the queue at the level corresponding to the delay jitter associated with the packet, and sending the packet which has been dequeued to a network, wherein:

in the enqueuing process, the at least one processor reenqueues a packet which has been dequeued from a queue at a second level into a queue at a first level that corresponds to the delay jitter associated with the packet, the second level being different from the first level;

the plurality of queues are classified into levels such that delay granularity is greater as the level increases;

in the acquisition process, the at least one processor acquires the packet that is associated with a sending timing which is requested and with the delay jitter;

in the enqueuing process, the at least one processor enqueues the packet acquired in the acquisition process into a queue corresponding to the sending timing associated with the packet, and the at least one processor enqueues a packet which has been dequeued from a queue at the second level into a queue at a level that is one level below the second level, the second level being higher than the first level.

12. The packet control apparatus as set forth in claim 11, wherein:

in the dequeuing process, the at least one processor dequeues, in one or more separate stages, packets which have been enqueued into each queue.

13. The packet control apparatus as set forth in claim 11, wherein:

the at least one processor further carries out a calculation process of calculating the first level with use of the delay jitter associated with the packet.

14. The packet control apparatus as set forth in claim 13, wherein:

in the acquisition process, the at least one processor acquires the packet that is associated with the delay jitter and a packet that is not associated with the delay jitter; and in the calculation process, the at least one processor calculates a highest level among a plurality of levels as the first level for the packet that is not associated with the delay jitter.

* * * * *